United States Patent Office 3,447,153
Patented May 27, 1969

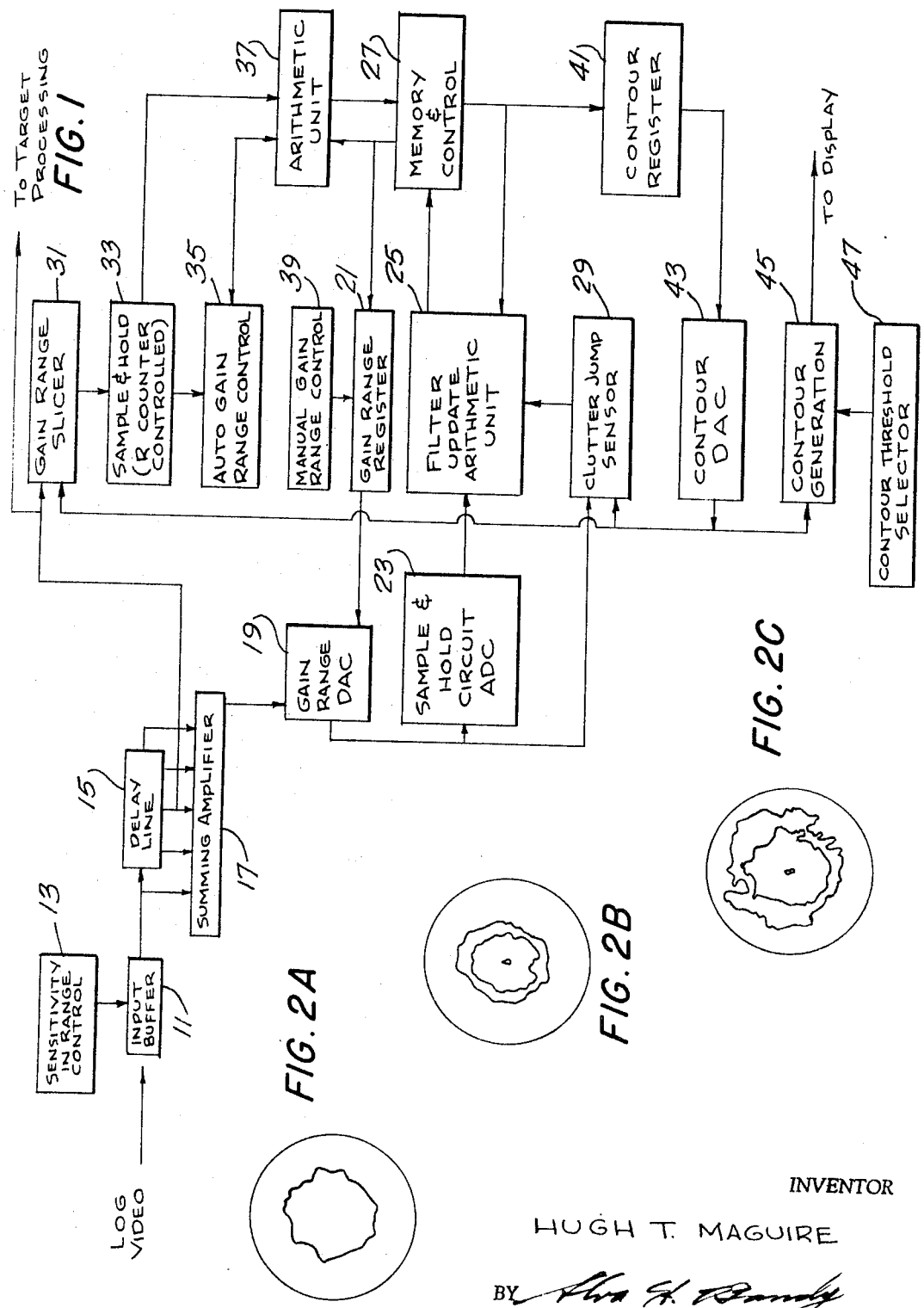

3,447,153
WEATHER OUTLINE CONTOUR GENERATOR
Hugh T. Maguire, Malvern, Pa., assignor to the United States of America as represented by the Secretary of the Army and/or the Administrator of the Federal Aviation Administration
Filed Oct. 15, 1968, Ser. No. 767,772
Int. Cl. G01s 9/42
U.S. Cl. 343—5         6 Claims

ABSTRACT OF THE DISCLOSURE

The present invention provides a radar system for accurately generating weather contours by the accurate estimation of the power level return from weather clutter. The basic functions performed in generating weather contours according to the present system include controlling the sensitivity in accordance with range, providing RMS estimates of the power level of weather clutter and providing a self calibrating system for automatically adjusting for detected inaccuracies.

Background of the invention

In prior art arrangements, the weather contour generating systems encountered several problems including the fact that the dynamic range of the system occasionally was not adequate for the range of the received radar returns. Also, the prior art arrangements did not provide means for correcting for system inaccuracies.

Summary of the invention

In accordance with the present invention, there is provided a weather outline contour generator for providing highly accurate weather contour information. This is achieved by providing analog and digital circuitry operating on the returned radar log video or on MTI video to form an RMS estimate of the level of weather clutter and including self calibration circuitry for determining the accuracy of the RMS value of the range-compensated video being estimated in the existing weather state. If poor estimates are consistently made, a system parameter is adjusted to eliminate the error. The self calibration feature also corrects for time variations and possible deficiencies within the system in addition to correcting for variations in the weather state.

Accordingly, it is an object of the present invention to provide more accurate radar weather contour information than heretofore provided by prior art arrangements.

It is another object of the present invention to provide RMS estimates of the strength of the signal returned from a small area of weather clutter scanned by the radar in order to generate weather contours.

It is a further object of the present invention to utilize returned radar log video and to adjust the signal level in accordance with range so as to enable the dynamic range of the weather contour generator system to approach the dynamic range of the log video.

It is still another object of the present invention to provide a weather contour generator having a self calibrating feature for correcting for detected inaccuracies in the generating system.

Other objects and many of the attendant advantages of this invention will become more fully apparent from the following detailed description when considered in connection with the accompanying drawing which illustrates a preferred embodiment.

Brief description of the drawing

FIG. 1 is a block diagram arrangement of the weather outline contour generator system of the present invention; and FIGS. 2A, B and C show three levels of contour generated by the present invention.

Description of the preferred embodiment

Referring now to FIG. 1, there is shown the weather outline generator system block diagram with the radar log video feeding an input buffer 11. An output from a sensitivity in range control circuit 13 also feeds the buffer 11 and serves to attenuate the incoming log video. The signal from circuit 13 results in an attenuation of the log video which decreases as a function of range (R). This correction factor, generated by analog circuitry, can be varied from log $R^2$ to log $R^4$. In addition to being able to vary the exponent from 2 through 4, the magnitude of the output of the sensitivity in range control circuit can be varied from 0 through −4 volts according to the preferred embodiment.

The detection of the weather intensity uses a procedure for estimating the mean value of the range compensated video. As shown, the range corrected video is fed to a delay line 15 which gives a delay equal to four range cells and is used in obtaining a mean estimate on the present radar sweep. The taps on the delay line 15 are spaced by one range cell with the output therefrom being fed to a summing amplifier 17 wherein the taps are weighted equally. The estimate of the mean for the present sweep is modified by the gain range digital-to-analog converter 19 which forms a part of the system self calibration function of the present invention. The converter 19 is fed by a gain range register 21 and the resultant modification of the summing amplifier output by the digital-to-analog converter 19 is encoded and sampled each ½ nautical mile by a sample and hold circuit 23 which converts the analog signal to digital form and holds the most significant four bits. This occurs prior to the acceptance of data by the filter update arithmetic unit 25. The unit 25 accepts the encoded estimate of the mean for the present sweep and subtracts from it the stored estimate which was stored in the memory 27. The difference is weighted and added to the estimate from the previous sweep. The resultant is stored in the memory 27 as the filter mean until the same range cell on the following sweep receives a new estimate. In this manner the estimates are smoothed in azimuth, progressively reducing the effects of the past estimates.

The relative weighting applied to the estimate is determined by a clutter jump sensor circuit 29. During periods of little clutter or in the middle of clutter, indicated by the relative amplitude of the estimate of the mean for the present sweep and of the stored estimate being of the same value, the clutter jump sensor 29 selects the following smoothing function for the filter update arithmetic unit 25:

$$FM_n = \tfrac{1}{8} PM_n + \tfrac{7}{8} FM_{(n-1)}$$

where:

$FM_n$=new filter mean,
$FM_{(n-1)}$=stored (last sweep) filter mean,
$PM_n$=present mean.

However, if the estimate of the mean for the present sweep is greater or less than the stored estimate (filter mean) by a magnitude greater than 2.5, indicating the processing of either the leading edge or trailing edge of clutter, the clutter jump sensor modifies the smoothing function for the filter update arithmetic unit to:

$$FM_n = \tfrac{1}{4} PM_n + \tfrac{3}{4} FM_{(n-1)}$$

Accordingly, a corrected mean value is obtained by the filter update arithmetic unit 25 and in order to obtain the RMS value, the mean value for the assumed Rayleigh distributed noise is multiplied by factor of 1.045. This multiplication may take place in the contour generator unit of this system.

The system also includes a unique feature which is the self calibration function. The purpose of this function is to correct for poor RMS estimates made due to the fact that the time constants of the filter may not be matched to the existing weather conditions. To achieve this self calibration, the display is in effect divided into a plurality of blocks or wedges in azimuth and in range. Dividing the display or surveilled volume in this way makes it possible to correct for errors made at particular ranges and azimuths. The system is an adaptive system in that the controls adjust in accordance with the estimate of performance at partciular ranges and azimuths and in contrast to an ordinary feedback control system, the gain parameter is varied in order to achieve the desired performance.

For each of the blocks into which the sweep period is divided, a sum range, gain range and gain azimuth are stored along with the corresponding filter means. For purposes of contour generation, only range information is required and thus the processing of azimuth information will not be discussed. The sum range represents the number of times the clutter density of a sample range cell in the block exceeds a percentage of the RMS estimate for the area around the sampled range cell. The sum range is derived by making a test of the rate at which ones are being generated by a slicer whose reference level is a function of the RMS estimate. The test is performed by sampling the gain range slicer 31 at one range cell in the block by means of the sample and hold circuit 33 which is controlled by the range counter on each sweep. Thus, the sum range which is stored in the memory unit 27 accumulates the number of ones obtained by this sampling method.

The sum range is accumulated for a fixed number of sweep periods. The number of sweep periods is equal to the number of 1.5 nautical mile blocks utilized by the self calibration function. At the end of the fixed number of sweep periods, the value of the sum range is utilized to modify the value of the gain range. The modification process is performed by the auto gain range control 35 which includes a sum range counter for obtaining a count of the gain range slicer 31 output over an interval of many sweeps. At the end of the sample interval, the accumulated sum range for the present block is compared with the range value selected at the control panel by means of an arithmetic unit 37 and the gain range is modified as required. If the sum range is less than the set range switch value, the gain range is decremented. The thus modified gain range is then stored in the memory and is used as the gain range value for the next sweep interval for that range block and is passed onto the gain range register 21 for further processing. A manual gain range control 39 provides a gain range value which is switch selectable at the control panel. The manual gain range value is utilized when an open loop mode of operation is selected, i.e., when the self calibration feature is disabled.

In order to obtain contour generation, the stored value of the estimate when read from the memory 27 is loaded into the contour register 41 and from there it is converted to an analog signal by the contour digital-to-analog converter 43. This analog signal, as shown in FIG. 1, feeds the clutter jump sensor 29 and the gain range slicer 31 providing a reference level therefor. The output of the digital-to-analog converter 43 also feeds a contour generator 45 wherein the mean estimated signal is multiplied by the factor 1.045 to provide the RMS estimate and wherein the analog signal is compared to one of three reference levels, using three separate slicers such that varying levels of contour may be generated depending upon the reference level selected. The threshold levels are set by a selector switch circuit 47 with, for example, one reference level corresponding to low intensity weather and a single contour; a second reference level corresponding to a higher intensity weather condition; and a third reference level corresponding to the highest intensity weather with a plurality of contours. The generated contours are shown in FIG. 2. The operation is such that when the RMS estimate goes more negative than the threshold of any of these slicers, the output of the slicer goes to the one state and a pulse is generated when the RMS estimate crosses the threshold in either direction. The generated pulses may then be passed to suitable monitors for visual display of the weather contour. The displays may be provided with means for moving the display beam in azimuth in relation to the sweep of the radar to provide a complete azimuthal display for the range of each sweep.

Thus, the weather outline contour generator of the present invention has several features which contribute to the generation of useful contours of weather clutter including the processing of log video which is not likely to saturate even on the strongest return from weather clutter and the use of sensitivity in range control circuit which reduces the effect that the distance of the weather has upon the size of the contour. The insertion of the range control correction at the beginning of the signal processing results in the dynamic range of the complete system approaching the dynamic range of the log video. The system may also be utilized to process MTI video returns. Additional features of the present system which provide improved contour generation include the fact that the RMS estimates are made using a sample size which gives statistically reliable estimates and that the sample size is altered by changing the weighting of the filter unit. The system also includes a self calibration feature which automatically corrects to compensate for component drift within the system and for variations in the weather clutter characteristics when its peformance criteria indicates an error is present.

Accordingly, although each of the boxes shown in FIG. 1 is well known or can be readily constructed using known techniques, the invention resides in the novel combination thereof to provide the weather outline contour generator of the present invention.

I claim:
1. A weather outline contour generator system wherein a radar system successively sweeps an area at varying ranges and provides return log video signals for each radar sweep to produce successive elemental contour portions of each sweep comprising in combination:
(a) means for receiving returned radar log video signals indicative of weather clutter for the present radar sweep;
(b) means coupled to said receiving means for attenuating the received signals in accordance with the range of the present radar sweep to provide a range-compensated signal;
(c) means for processing the range-compensated signal to provide an estimate of the mean value of such signal for the present sweep;
(d) memory means for storing an estimated mean value signal for each radar sweep in accordance with the range for such sweep;
(e) contour generating means for receiving a stored estimated mean value signal at the range of the present sweep from said memory means and for providing an output signal in response to stored estimated signal; and
(f) self calibrating means coupled to said signal processing means and said memory means for comparing the estimated signal for the range of the present sweep formed by said processing means with the stored estimated signal for the range of the present sweep from said memory means and for providing an output signal dependent upon the difference in the signals for adjusting system parameters of the weather outline contour generator.

2. A weather outline contour generator as defined in claim 1 wherein said contour generating means includes means for converting the estimated mean value signal to an estimated root mean square signal.

3. A weather outline contour generator as defined in claim 2 wherein said signal processing means includes:
  (a) delay line means having a plurality of outputs for providing a plurality of delayed output signals of the range-compensated signal; and
  (b) summing amplifier means for summing the delayed outut signals and for providing an estimate of the mean value of the range-compensated signals for each radar sweep.

4. A weather outline contour generator as defined in claim 1 wherein said signal processing means further includes:
  (a) a gain range register;
  (b) digital-to-analog converter means coupled to the output of said gain range register and to the output of said summing amplifier for modifying the estimated signal in accordance with the signal of the gain range register;
  (c) a sample and hold circuit means for converting the modified estimated signal from an analog signal to a digital signal and for holding the most significant bits of the digital signal;
  (d) filter update arithmetic means coupled to said sample and hold circuit means and said memory means for subtracting the present estimated signal from a corresponding stored estimated signal to provide a difference signal and for modifying the difference signal by a predetermined factor and adding the modified signal to the stored estimated signal to provide an output of an estimated signal for the present sweep for storage in said memory means; and
  (e) clutter jump sensor means responsive to the modified estimated signal for the present sweep from said digital-to-analog converter and to the stored estimated signal for the corresponding prior sweep for controlling the modifying of the difference signal by said filter update arithmetic means.

5. A weather outline contour generator as defined in claim 4 and further comprising:
  (a) contour register means for holding the estimated signal stored in said memory means in digital form;
  (b) contour digital analog converter means responsive to the signal in said contour register means for providing an output analog signal thereof to said clutter jump sensor means and said contour generating means; and
  (c) contour threshold selector means for setting a threshold level for said contour generating means such that an output signal is only provided by said contour generating means when the estimated root mean square signal exceeds the threshold level.

6. A weather outline contour generator as defined in claim 5 wherein said self calibrating means includes:
  (a) gain range slicer means responsive to the output from one of the taps of said delay line and the output of said contour digital-to-analog converter for providing an output signal when the output signal from said delay line exceeds the output signal from said contour digital-to-analog converter;
  (b) sample and hold circuit means for accumulating the output signals from said slicer for a single sweep and for feeding the resultant signal to said memory means;
  (c) arithmetic means for comparing the stored resultant signal from said memory means with the predetermined signal and for providing an output signal indicative of the difference of the compared signals; and
  (d) gain range register means having a gain range signal stored therein and responsive to the output of said arithmetic means for increasing or decreasing the stored signal.

References Cited
UNITED STATES PATENTS

| | | | |
|---|---|---|---|
| 2,994,079 | 7/1961 | Obloy et al. | 343—5 |
| 3,117,283 | 1/1964 | Fresoman et al. | 343—5 |
| 3,287,726 | 11/1966 | Atlas | 343—5 |

RODNEY D. BENNETT, JR., *Primary Examiner.*

C. L. WHITHAM, *Assistant Examiner.*